(12) United States Patent
Whitley

(10) Patent No.: US 7,651,549 B2
(45) Date of Patent: Jan. 26, 2010

(54) PRESSURE SWING ADSORPTION PROCESS WITH IMPROVED RECOVERY OF HIGH-PURITY PRODUCT

(75) Inventor: Roger Dean Whitley, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 580 days.

(21) Appl. No.: 11/451,663

(22) Filed: Jun. 13, 2006

(65) Prior Publication Data
US 2007/0283807 A1 Dec. 13, 2007

(51) Int. Cl.
*B01D 53/02* (2006.01)
(52) U.S. Cl. .............................. 95/96; 95/100; 95/103; 96/130
(58) Field of Classification Search ...................... 95/96, 95/100, 103; 96/130
See application file for complete search history.

(56) References Cited

U.S. PATENT DOCUMENTS

| | | | |
|---|---|---|---|
| 4,406,675 A | 9/1983 | Dangieri et al. |
| 4,915,711 A | 4/1990 | Kumar |
| 5,026,406 A | 6/1991 | Kumar |
| 5,042,995 A | 8/1991 | Mitariten |
| 5,203,888 A | 4/1993 | Maurer |
| 5,248,322 A | 9/1993 | Kumar |
| 5,254,154 A | 10/1993 | Gauthier et al. |
| 5,328,503 A | 7/1994 | Kumar et al. |
| 5,330,561 A | 7/1994 | Kumar et al. |
| 5,354,346 A | 10/1994 | Kuma |
| 5,411,578 A | 5/1995 | Watson et al. |
| 5,429,666 A | 7/1995 | Agrawal et al. |

(Continued)

FOREIGN PATENT DOCUMENTS

EP 0 354 259 8/1988

(Continued)

OTHER PUBLICATIONS

Whitley, Roger et al., Development of a High Recovery O2 Pvsa System, 2005 American Institute of Chemical Engineers Annual Meeting, Nov. 3, 2005, Cincinnati, Ohio, Presentation Session #515.

(Continued)

*Primary Examiner*—Robert A Hopkins
(74) *Attorney, Agent, or Firm*—John M. Fernbacher; Ann B. Kiernan

(57) ABSTRACT

Process step in a pressure swing adsorption process using multiple parallel adsorbent beds operating in cyclic process steps to recover a less strongly adsorbable component from a feed gas mixture containing at least one less strongly adsorbable component and at least one more strongly adsorbable component, wherein each adsorbent bed has a feed end and a product end, wherein each bed is subjected to at least a feed/product step, one or more depressurization steps, a purge step in which a purge gas enriched in the less strongly adsorbable component is introduced into the product end of the bed and a purge effluent gas is withdrawn from the feed end of the bed, and one or more repressurization steps. The process step comprises introducing at least a portion of the purge effluent gas from a first bed into the feed end of a second adsorbent bed at any time other than during the feed/product step in the second adsorbent bed.

29 Claims, 2 Drawing Sheets

U.S. PATENT DOCUMENTS

| | | | |
|---|---|---|---|
| 5,540,758 A | 7/1996 | Agrawal et al. | |
| 5,542,966 A | 8/1996 | D'Amico et al. | |
| 5,632,803 A | 5/1997 | Stoner et al. | |
| 5,656,067 A | 8/1997 | Watson et al. | |
| 5,707,425 A | 1/1998 | D'Amico et al. | |
| 6,083,299 A * | 7/2000 | Kapoor et al. | 95/100 |
| 6,315,818 B1 | 11/2001 | Monereau | |
| 6,432,170 B1 | 8/2002 | Chiang et al. | |
| 7,179,324 B2 * | 2/2007 | Baksh et al. | 95/100 |
| 2003/0047071 A1 | 3/2003 | Dolan et al. | |
| 2005/0257686 A1 | 11/2005 | Occhialini et al. | |

FOREIGN PATENT DOCUMENTS

| | | |
|---|---|---|
| EP | 0 590 615 A1 | 4/1994 |
| EP | 0 621 069 A1 | 10/1994 |
| EP | 0 923 976 A1 | 6/1999 |
| EP | 1 078 674 A2 | 2/2001 |
| EP | 1 302 233 A2 | 4/2003 |
| GB | 2 227685 A | 8/1990 |
| WO | WO2004/089510 A3 | 10/2004 |

OTHER PUBLICATIONS

Whitley, Roger, et al., Development of a High Recovery O2 PVSA System, AlChHE Conference, Nov. 3, 1995; (abstract).

Kumar, R., et al., A Versatile Process Simulator For Adsorptive Separations; Chemical Engineering Science, vol. 49, No. 18, pp. 3115-3125; Great Britian.

Perry, R.H., et al; Perry's Chemical Engineer's Handbook (7th Edition); 1997.

* cited by examiner

PRESSURE SWING ADSORPTION PROCESS WITH IMPROVED RECOVERY OF HIGH-PURITY PRODUCT

BACKGROUND OF THE INVENTION

Pressure swing adsorption is a well-known method for the separation of bulk gas mixtures and for the purification of gas streams containing low concentrations of undesirable components. The method has been developed and adapted for a wide range of feed gases, operating conditions, product purity, and product recovery. Many pressure swing adsorption systems utilize two or more adsorbent beds operated in a cyclic sequence in order to maintain a constant product flow rate while selected beds undergo various steps including adsorption, depressurization, evacuation, purge, pressure equalization, repressurization, and other related steps. Multiple adsorbent beds using numerous process steps are required to achieve high purity and/or recovery of valuable gaseous products such as hydrogen, carbon oxides, synthesis gas, light hydrocarbons, and the like. Multiple adsorbent beds using these process steps also are used to recover oxygen from air for various applications including portable medical oxygen concentrators.

Many of these pressure swing adsorption processes operate partially at pressures below atmospheric and are described in the art as vacuum swing adsorption (VSA) or pressure-vacuum swing adsorption (PVSA) processes. In the present specification, pressure swing adsorption (PSA) is used as a generic term to describe all types of cyclic adsorption systems regardless of operating pressure levels.

In pressure swing adsorption process cycles, the gas needed for the purge and repressurization steps is provided by gas obtained during other process steps. Repressurization can be accomplished by using final product gas, intermediate gas obtained by pressure equalization among beds, feed gas, or combinations thereof. Purge can be provided by intermediate depressurization gas from other beds and/or by final product gas.

Feed repressurization is disclosed in representative U.S. Pat. Nos. 4,406,675 and 5,540,758, and in European Patent Publication No. 0 354 259. The use of product gas for purge and/or repressurization is presented in representative U.S. Pat. Nos. 5,328,503, 5,411,578, 5,429,666, and 5,656,067. U.S. Pat. Nos. 5,330,561 and 5,203,888 disclose bed repressurization using pressurized feed gas or product gas.

It is desirable in pressure swing adsorption processes to minimize the amount of product gas used for purge and repressurization in order to increase product recovery. This can be difficult in many cases because of feed gas composition, product purity requirements, and product recovery requirements. In most pressure swing adsorption processes, for example, there is a tradeoff between product purity and product recovery wherein an increase product purity is accompanied by a decrease in product recovery. There is a need in the art for improved process cycles that allow increased product recovery at higher product purity levels, and this need is addressed by the invention described below and defined by the claims that follow.

BRIEF SUMMARY OF THE INVENTION

A first embodiment of the invention includes a process step in a pressure swing adsorption process using multiple parallel adsorbent beds operating in cyclic process steps to recover a less strongly adsorbable component from a feed gas mixture containing at least one less strongly adsorbable component and at least one more strongly adsorbable component, wherein each adsorbent bed has a feed end and a product end, wherein each bed is subjected to at least a feed/product step, one or more depressurization steps, a purge step in which a purge gas enriched in the less strongly adsorbable component is introduced into the product end of the bed and a purge effluent gas is withdrawn from the feed end of the bed, and one or more repressurization steps. The process step comprises introducing at least a portion of the purge effluent gas from a first adsorbent bed into the feed end of a second adsorbent bed at any time other than during the feed/product step in the second adsorbent bed.

Another embodiment relates to a pressure swing adsorption process for recovering a less strongly adsorbable component from a feed gas mixture containing at least one less strongly adsorbable component and at least one more strongly adsorbable component, wherein the process comprises performing cyclic process steps in a plurality of adsorbent beds, each bed having a feed end, a product end, and adsorbent material which selectively adsorbs the more strongly adsorbable component, each bed proceeding in turn through cyclic process steps which include a feed/product step, one or more depressurization steps in which gas is withdrawn from the bed at decreasing pressure, a purge step in which a purge gas enriched in the less strongly adsorbable component is introduced into the product end of the bed and a purge effluent gas is withdrawn from the feed end of the bed, and one or more repressurization steps in which gas is introduced into the bed at increasing pressure. One of the repressurization steps comprises introducing at least a portion of the purge effluent gas withdrawn from the feed end of a first bed into the feed end of a second bed at any time other than during the feed/product step in the second adsorbent bed.

An alternative embodiment includes a pressure swing adsorption process for the separation of a feed gas containing at least one more strongly adsorbable component and at least one less strongly adsorbable component, which process comprises the steps of:

(1) introducing the feed gas into a feed end of a first adsorbent bed containing adsorbent material which preferentially adsorbs the more strongly adsorbable component and withdrawing from a product end of the first adsorbent bed a product gas enriched in the less strongly adsorbable component;

(2) continuing to introduce the feed gas into the first adsorbent bed and to withdraw the product gas from the first adsorbent bed, and introducing a portion of the product gas into the product end of a second bed undergoing a repressurization step;

(3) terminating the introduction of the feed gas into the first adsorbent bed and the withdrawal of the product gas from the first adsorbent bed, withdrawing depressurization gas from the product end thereof, and introducing the depressurization gas withdrawn from the product end thereof into the product end of a third adsorbent bed undergoing a repressurization step;

(4) withdrawing additional depressurization gas from the product end of the first adsorbent bed and introducing the depressurization gas withdrawn therefrom into the product end of a fourth adsorbent bed undergoing a purge step;

(5) evacuating gas from the feed end of the first adsorbent bed;

(6) introducing a purge gas into the product end of the first adsorbent bed while continuing to evacuate gas from the feed end thereof, and introducing at least a portion of the gas evacuated from the feed end thereof into the feed end of the fourth adsorbent bed undergoing a repressurization step;

(7) introducing a repressurization gas into the product end of the first adsorbent bed, wherein the repressurization gas is provided by depressurization gas withdrawn from the third adsorbent bed undergoing a depressurization step;

(8) introducing additional repressurization gas into the product end of the first adsorbent bed, wherein the additional repressurization gas is provided by a portion of the product gas withdrawn from the fourth adsorbent bed undergoing a feed/product step, and introducing a purge effluent gas into the feed end of the first adsorbent bed, wherein the purge effluent gas is provided by at least a portion of the gas evacuated from the feed end the second adsorbent bed undergoing a purge step; and (9) repeating steps (1) through (8) in a cyclic manner.

A related embodiment of the invention includes a pressure swing adsorption system for the separation of a feed gas containing at least one more strongly adsorbable component and at least one less strongly adsorbable component, wherein the system comprises (a) a plurality of adsorber vessels, each adsorber vessel having a feed end, a product end, and a bed of adsorbent material containing at least one adsorbent adapted to selectively adsorb the more strongly adsorbable component;

(b) piping and valves adapted to introduce a feed gas into the feed end of each adsorber vessel and to withdraw a product gas enriched in the less strongly adsorbable component from the product end of each adsorber vessel; and (c) piping and valves adapted to transfer a depressurization gas enriched in the less strongly adsorbable component from the product end of a first adsorber vessel to the product end of a second adsorber vessel and to transfer a purge effluent gas from the feed end of the second adsorber vessel into the feed end of a third adsorber vessel at any time other than during a feed/product step in the third adsorber vessel.

Another related embodiment includes a pressure swing adsorption system for the separation of a feed gas containing at least one more strongly adsorbable component and at least one less strongly adsorbable component. The system comprises (a) four adsorber vessels, each adsorber vessel having a feed end, a product end, and a bed of adsorbent material containing at least one adsorbent adapted to selectively adsorb the more strongly adsorbable component; and (b) piping and valves adapted to (1) introduce a feed gas into the feed end of a first adsorber vessel and to withdraw a product gas enriched in the less strongly adsorbable component from the product end of the first adsorber vessel;

(2) transfer a portion of the product gas enriched in the less strongly adsorbable component into the product end of a second adsorber vessel;

(3) withdraw depressurization gas from the product end of the first adsorber vessel and introduce the withdrawn depressurization gas into the product end of a third adsorber vessel;

(4) withdraw depressurization gas from the product end of the first adsorber vessel and introduce the withdrawn gas into the product end of a fourth adsorber vessel;

(5) withdraw gas from the feed end of the first adsorber vessel by use of a vacuum pump or blower and discharge the withdrawn gas as waste gas;

(6) introduce purge gas into the product end of the first adsorber vessel wherein the purge gas is provided from the second adsorber vessel while evacuating the first adsorber vessel from the feed end and introducing at least a portion of the evacuated purge effluent gas into the feed end of the fourth adsorber vessel (7) pressurize the first adsorber vessel adsorber vessel by introducing repressurization gas into the product end of the first adsorber vessel wherein the repressurization gas is provided by the third adsorber vessel; and (8) pressurize the first adsorber vessel by introducing product gas obtained from the fourth adsorber vessel into the product end of the first adsorber vessel and introducing purge effluent gas into the feed end of the first adsorber vessel wherein the purge effluent gas is obtained from the second adsorber vessel.

DETAILED DESCRIPTION OF THE INVENTION

Figure 1:
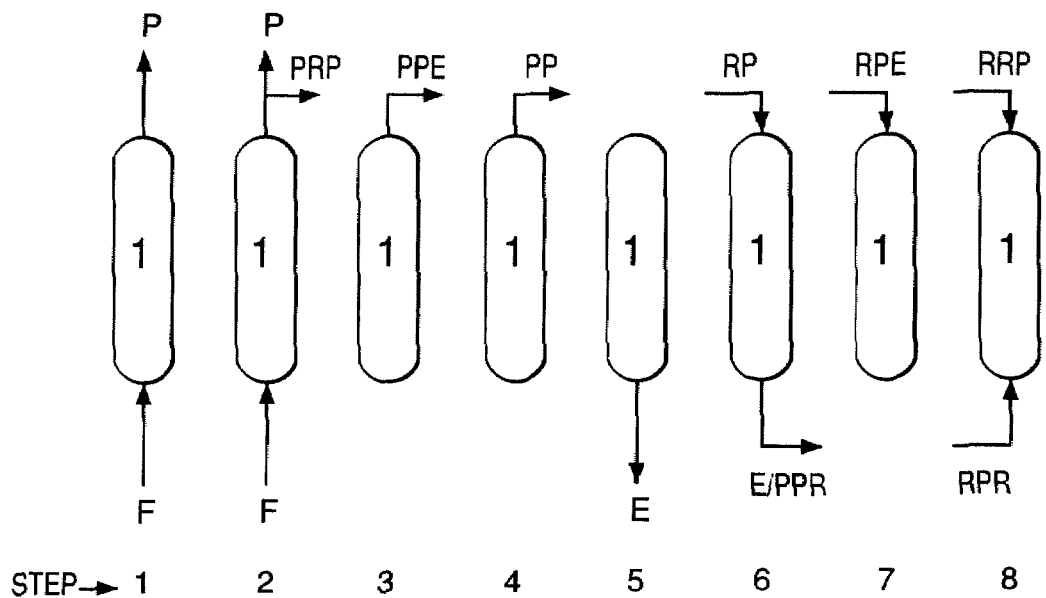
FIG. 1 is a schematic depiction of the gas flow to and from an adsorbent bed during the PSA cycle steps of an embodiment of the invention.

The embodiments of the invention utilize a pressure swing adsorption process cycle for separating gas mixtures in which at least a portion of the purge effluent gas from an adsorbent bed undergoing a purge step is used to repressurize another adsorbent bed at any time other than during a feed/product step in the other adsorbent bed. The process may be used, for example, for increasing the recovery of high purity oxygen from air utilizing a plurality of adsorbers operated according to an improved process cycle.

In the present disclosure, the term product gas means gas of sufficient product purity withdrawn from the adsorbent beds that is sent, with or without intermediate storage, to a final end use. A feed/product step is defined as the introduction of feed gas into the feed end of the bed and the withdrawal of product gas from the product end of a bed. While pressure may increase in the bed during this step, this step is distinct from the repressurization step defined below. Depressurization is defined as the withdrawal of gas from an adsorbent bed accompanied by decreasing bed pressure. Depressurization can be achieved by venting gas from a superatmospheric pressure directly to the atmosphere or transferring gas to another process vessel or enclosed volume which is at a lower pressure. Depressurization also can be achieved by evacuation, which is defined as the withdrawal of gas from the bed by a vacuum pump or blower. Evacuation can be carried out over any range of bed pressures, but typically is carried out at subatmospheric pressures, i.e., under vacuum. Repressurization is defined as the introduction of gas into the vessel containing the adsorbent bed accompanied by increasing bed pressure at any time other than during the feed/product step. The transfer of depressurization gas from one vessel for use as repressurization gas in another vessel is often described in the art as pressure equalization, although the pressures in the two beds do not necessarily become equal at the end of the step.

Purge is defined as the introduction of a purge gas into the product end of the vessel while a purge effluent gas is withdrawn from the feed end of the vessel. Purge can be carried out at decreasing bed pressure, increasing bed pressure, constant bed pressure, or any combination thereof. Purge is generally most effective at subatmospheric pressures when the product of interest is the less strongly adsorbable component. Purge gas, when used in a pressure swing adsorption process to recover a less strongly adsorbable component from a feed gas mixture comprising at least one less strongly adsorbable component and at least one more strongly adsorbable component, is defined as any gas enriched in the less strongly adsorbable component. The concentration of the more strongly adsorbable component in the purge effluent gas is higher than in the purge gas. Purge repressurization is defined as transferring at least a portion of the purge effluent gas from the feed end of an adsorbent bed undergoing the purge step to the feed end of another bed undergoing a repressurization step at any time other than during the feed/product step.

The term "enriched" as applied to a gas stream in a pressure swing adsorption process means that the gas stream contains a concentration of a component that is higher than the concentration of that component in the feed gas. Void space gas is defined as non-adsorbed gas contained within the interstitial or interparticle volume within the adsorber vessel, and includes gas in the piping and vessel dead volume which is not occupied by adsorbent. Atmospheric air is uncompressed air obtained directly from the surrounding atmosphere.

Henry's Law selectivity describes the selectivity of a given adsorbent for the separation of a first component from a second component in a gas mixture containing the two components. Henry's Law selectivity is defined as the ratio of the Henry's Law constant for the first component adsorbed on the adsorbent material at selected conditions to the Henry's Law constant for the second component adsorbed on the same adsorbent material at the same conditions. The Henry's Law constant is defined as the initial slope of the isotherm that describes the amount of the component adsorbed as a function of gas pressure, preferably at a reference temperature of 23° C.

The terms "more strongly adsorbable" and "less strongly adsorbable", when used to describe components in a gas mixture being separated by a pressure or vacuum swing adsorption process, describe the relative adsorption characteristics of components in the gas mixture on the adsorbent material in the adsorbent bed. The equilibrium adsorption capacity of the adsorbent material for the more strongly adsorbable component (as a pure component) is greater than the equilibrium adsorption capacity of the adsorbent material for the less strongly adsorbable component (as a pure component) at the average temperature and pressure of the process.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

The generic term "pressure swing adsorption" (PSA) as used herein applies to all adsorptive separation systems operating between a maximum and a minimum pressure. The maximum pressure typically is superatmospheric, and the minimum pressure may be super-atmospheric or sub-atmospheric. When the minimum pressure is sub-atmospheric and the maximum pressure is superatmospheric, the system typically is described as a pressure vacuum swing adsorption (PVSA) system. When the maximum pressure is at or below atmospheric pressure and the minimum pressure is below atmospheric pressure, the system is typically described as a vacuum swing adsorption (VSA) system.

In all embodiments, the feed gas contains at least one more strongly adsorbable component and at least one less strongly adsorbable component, and the product gas is enriched in the less strongly adsorbable component relative to the feed gas by the adsorption of the more strongly adsorbable component. The more strongly adsorbable component is removed from the adsorbent by depressurization, evacuation, and purge steps as described below. The feed gas may be below, at, or above atmospheric pressure.

The embodiments of the present invention can be carried out using a plurality of adsorbent beds operating in cyclic steps and can be used to separate any gas mixture comprising more strongly adsorbable and less strongly adsorbable components. The embodiments may be utilized in any PSA separation process including PVSA and VSA processes. The use of purge effluent gas for repressurization thus may be applied to any PSA, VSA, or PVSA process for the separation of any gas mixture. Certain embodiments described below are especially useful for recovering an oxygen product from air or other mixtures of oxygen with argon and/or nitrogen, and these embodiments may provide oxygen product at purities above 97 vol % and possibly above 99 vol %.

An exemplary embodiment of the invention utilizes four adsorbent beds and is illustrated by the cycle steps of Table 1 and the cycle chart of Table 2. Definitions of each cycle step are given in Table 1 below for a first bed wherein the first through fourth beds correspond to Beds 1 through 4 of Table 2.

TABLE 1

Cycle Step Descriptions

| Step No. | Cycle Step | Description |
|---|---|---|
| 1 | Feed/Product | Introduce feed gas into the feed end of a first bed and withdraw product gas from the product end of the first bed |
| 2 | Feed/Product + Provide Product Repressurization | Introduce feed gas into the feed end of the first bed, withdraw product gas from the product end of the first bed, and use a portion of the product gas for repressurizing a second bed undergoing step 8 |

TABLE 1-continued

Cycle Step Descriptions

| Step No. | Cycle Step | Description |
|---|---|---|
| 3 | Provide Pressure Equalization | Withdraw depressurization gas from the product end of the first bed and introduce the withdrawn gas into the product end of a third bed undergoing step 7 |
| 4 | Provide Purge | Withdraw depressurization gas from the product end of the first bed and introduce the withdrawn gas into the product end of a fourth bed undergoing step 6 |
| 5 | Evacuation | Withdraw gas from the feed end of the first bed by use of a vacuum pump or blower and discharge the withdrawn gas as waste gas |
| 6 | Receive Purge + Evacuate/ Provide Purge Repressurization | Introduce purge gas into the product end of the first bed wherein the purge gas is provided from the second bed undergoing step 4 while evacuating the first bed from the feed end and introducing at least a portion of the evacuated purge effluent gas into the feed end of the fourth bed undergoing step 8 |
| 7 | Receive Pressure Equalization | Pressurize the first bed by introducing repressurization gas into the product end of the first bed wherein the repressurization gas is provided by the third bed undergoing step 3 |
| 8 | Receive Product Repressurization + Receive Purge Repressurization | Pressurize the first bed by introducing product gas obtained from the fourth bed in step 2 into the product end of the first bed and introducing purge effluent gas into the feed end of the first bed wherein the purge effluent gas is obtained from the second bed undergoing step 6 |

TABLE 2

Cycle Chart

| Bed | Cycle Step | | | | | | | |
|---|---|---|---|---|---|---|---|---|
| 1 | 1 | 2 | 3 | 4 | 5 | 6 | 7 | 8 |
| 2 | 7 | 8 | 1 | 2 | 3 | 4 | 5 | 6 |
| 3 | 5 | 6 | 7 | 8 | 1 | 2 | 3 | 4 |
| 4 | 3 | 4 | 5 | 6 | 7 | 8 | 1 | 2 |
| Time Period | T1 | T2 | T3 | T4 | T5 | T6 | T7 | T8 |

An optional blowdown step may be utilized during at least a portion of step 4 and/or following step 4 prior to step 5 wherein waste gas is vented directly to the atmosphere from the feed end of the bed until the bed reaches approximately atmospheric pressure, at which point the evacuation step 5 begins.

Figure 2:
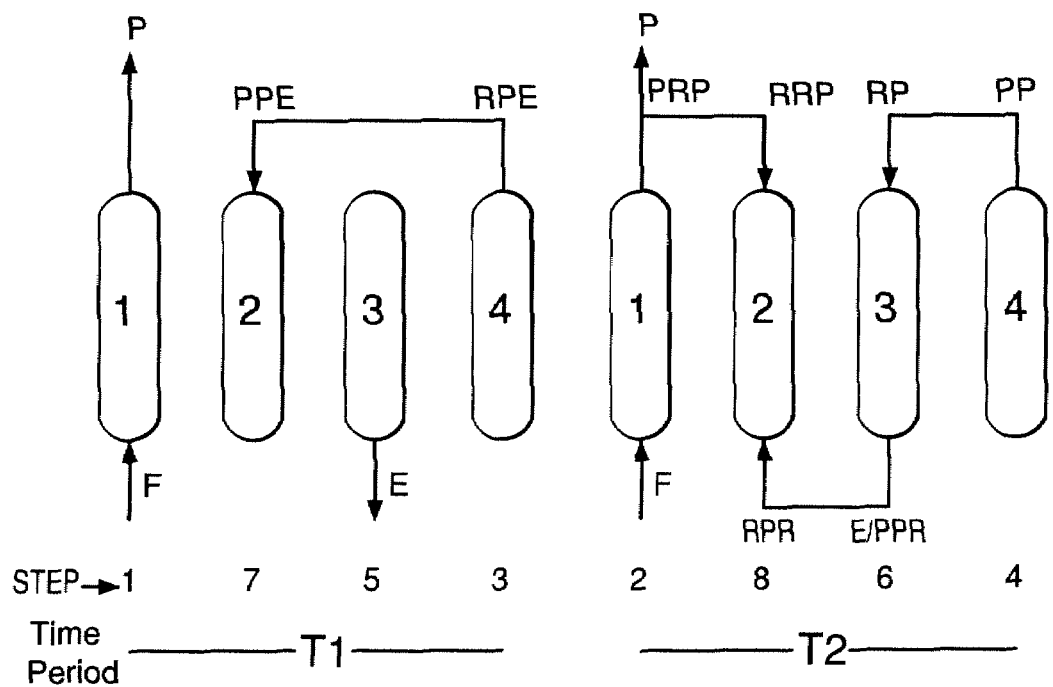
FIG. 2 is a schematic depiction of the gas flow relationships among the four adsorbent beds during two time periods in the PSA cycle steps of the embodiment of FIG. 1.

A schematic flow diagram of Bed 1 is shown in FIG. 1 to illustrate this bed undergoing sequential repeating steps 1 through 8. Beds 2, 3, and 4 proceed through the same sequence of steps during staggered time periods as shown in Table 2. FIG. 2 illustrates the gas flow relationships among Beds 1, 2, 3, and 4 during time periods T1 and T2. Analogous gas flow relationships occur sequentially among the four beds during time periods T3 through T8. This process cycle may be carried out using an appropriate pressure/vacuum swing adsorption system comprising a feed compressor or blower, a vacuum pump or blower, adsorbent, four adsorber vessels, piping, and flow control systems. Such PVSA systems are well known in the adsorptive gas separation art. If the feed gas is available at an appropriate pressure, a feed compressor or blower would not be needed. Feed gas, product gas, and inter-bed gas flows may be controlled by any appropriate valve and manifold system known in the art. For example, the system may utilize multiple controller-operated ball valves to effect the proper cycle steps. Alternatively, one or more rotary valves may be used for this purpose. An exemplary rotary valve that may be used here, for example, is described in U.S. patent application Ser. No. 10/197,859 filed on Aug. 5, 2005, which application is incorporated herein by reference.

While the above embodiment illustrates a PVSA cycle using four beds, other cycles are possible that include the feature of using purge effluent gas from one bed to repressurize another bed. For example, two or three beds may be used with appropriate cycle steps, but one or more gas storage tanks may be required. More than four beds may be used if additional pressure equalization steps are desired.

The process described above is particularly useful for recovering high purity oxygen (i.e., containing greater than 97 vol % oxygen) from air or from other mixtures of oxygen with argon and/or nitrogen wherein the purge effluent repressurization step allows oxygen recoveries of at least 10%. In addition, the use of purge effluent gas to repressurize a bed reduces the amount of product gas used for repressurization. Since product gas is at a higher pressure than the purge effluent gas, the use of purge effluent repressurization saves compression energy and reduces the overall process power requirements. Also, the process described above allows the use of adsorbents having a lower oxygen Henry's Law selectivity than is typically used in adsorbents in PVSA systems for recovering oxygen from air or other oxygen-containing gas. Adsorbents used in the various embodiments of the invention may have a Henry's Law selectivity for the more strongly adsorbable component to the less strongly adsorbable component of less than about 2.0 and possibly less than about 1.5. In the separation of air to yield a high purity oxygen product, the more strongly adsorbable component is argon and the less strongly adsorbable component is oxygen.

Any adsorbent or combination of adsorbents which selectively adsorbs nitrogen and/or argon may be used in the process described above for the recovery of oxygen from air or other mixtures of oxygen with argon and/or nitrogen. An exemplary adsorbent bed used in this process for recovering oxygen from any of these gas mixtures may contain a combination of adsorbents including activated alumina, NaX, NaKLSX (low silica X) or combinations thereof as a pretreatment zone for water, carbon dioxide and other impurity removal, followed by an optional layer of LiX or LiLSX zeolite, and then followed by a layer of AgLiLSX zeolite. Exemplary AgLiLSX zeolites that may be used in this process are disclosed in U.S. Pat. No. 6,432,170, which is incorporated herein by reference.

During the development of the present embodiments for the recovery of high purity oxygen from air, it was realized that oxygen concentration in the purge effluent gas during the later part of the purge step is higher than that in ambient air. Since the vacuum pump can be operated at any desired discharge pressure, the discharged purge effluent gas can be used for repressurization as described above. At least a portion of the purge effluent gas is used for repressurization of an adsorbent bed at any time other than during the feed/product step of that bed, and all of the purge effluent gas may be used for repressurization if desired.

In a typical PVSA process for recovering oxygen from air, the purge to feed ratio (P/F) is maintained at or near a selected design value that depends on various operating parameters including the oxygen purity. The purge to feed ratio (P/F) is defined as the ratio of the actual volume of gas withdrawn from the feed end of the bed during a cycle to the actual volume of gas introduced into the feed end of a bed during that cycle. The actual volume is defined as the value integrated over the course of a specific step, using the instantaneous values of molar flow rate, temperature and pressure. The P/F ratio may be illustrated with reference to FIG. 1 as the ratio of the sum of the actual gas volumes withdrawn from the feed end of bed 1 during steps 5 and 6 to the sum of the actual gas volumes introduced into the feed end of bed 1 during steps 1, 2, and 8.

The purge to feed ratio in the recovery of oxygen from air is generally greater than about 1.5 and may be greater than about 2.5 for oxygen product purities above 97 vol %. The required P/F ratio increases as product purity increases. The desired P/F ratio may be maintained by venting the evacuation stream only or by venting the evacuation stream and the first part of the purge effluent stream (which may have a low oxygen concentration). The remaining part of the purge effluent stream then may be used for repressurization. The use of all or a portion of the purge effluent stream for repressurization serves to recycle a stream richer in oxygen than the feed gas into a bed other than during the introduction of the feed gas into that bed during the feed/product step. The negative impact on oxygen product recovery of a high P/F ratio for a high purity product with a low selectivity adsorbent is somewhat offset by the use of purge effluent for repressurization.

In the cycle of Tables 1 and 2, repressurization step 8 is carried out by simultaneous introduction of purge effluent gas into the feed end of a bed and product gas into the product end of the bed. Alternatively, product end repressurization may be carried out completely before or completely after purge gas repressurization, or the period of product end repressurization may overlap the period of purge gas repressurization as desired.

The following Examples illustrate embodiments of the present invention but do not limit the invention to any of the specific details described therein.

EXAMPLE 1

A VPSA process was simulated using SIMPAC, which is a detailed adsorption process simulator. SIMPAC considers multicomponent adsorption isotherms, various mass transfer modes, numerous adsorbent layers, and general process flow-sheeting. More details about SIMPAC are discussed in Kumar et al., *Chemical Engineering Science*, Volume 49, Number 18, pages 3115-3125. The cycle in this Example is similar to that described in Tables 1 and 2, but without purge repressurization, i.e., all purge gas effluent evacuated from a bed during step 6 is vented rather than being used to repressurize another bed. The purge repressurization stream in step 8 is replaced with an equivalent actual volume of feed gas to maintain a similar pressure history at the bed inlet end. Each cycle step has a duration of 1.75 seconds and the total cycle time is 14 seconds. Each of the four adsorbent beds has a diameter of 42.7 mm and contains a first layer at the feed end of inert material to represent adsorbent for water and carbon dioxide removal with a depth of 43 mm, a second layer of LiLSX with a depth of 25 mm, and a third layer of 40% Ag-exchanged LiLSX with a depth of 145 mm. The system operates at 31° C. feed temperature to produce 1.29 standard liters per minute (Slpm) of oxygen with a purity of 99.0 mole % using a maximum air feed pressure of 2.57 atma and a feed end pressure ratio (maximum feed pressure to minimum evacuation pressure) of 5.05. The purge to feed ratio (defined above) was 3.33 and the oxygen product recovery was 20.85%.

Figure 3:
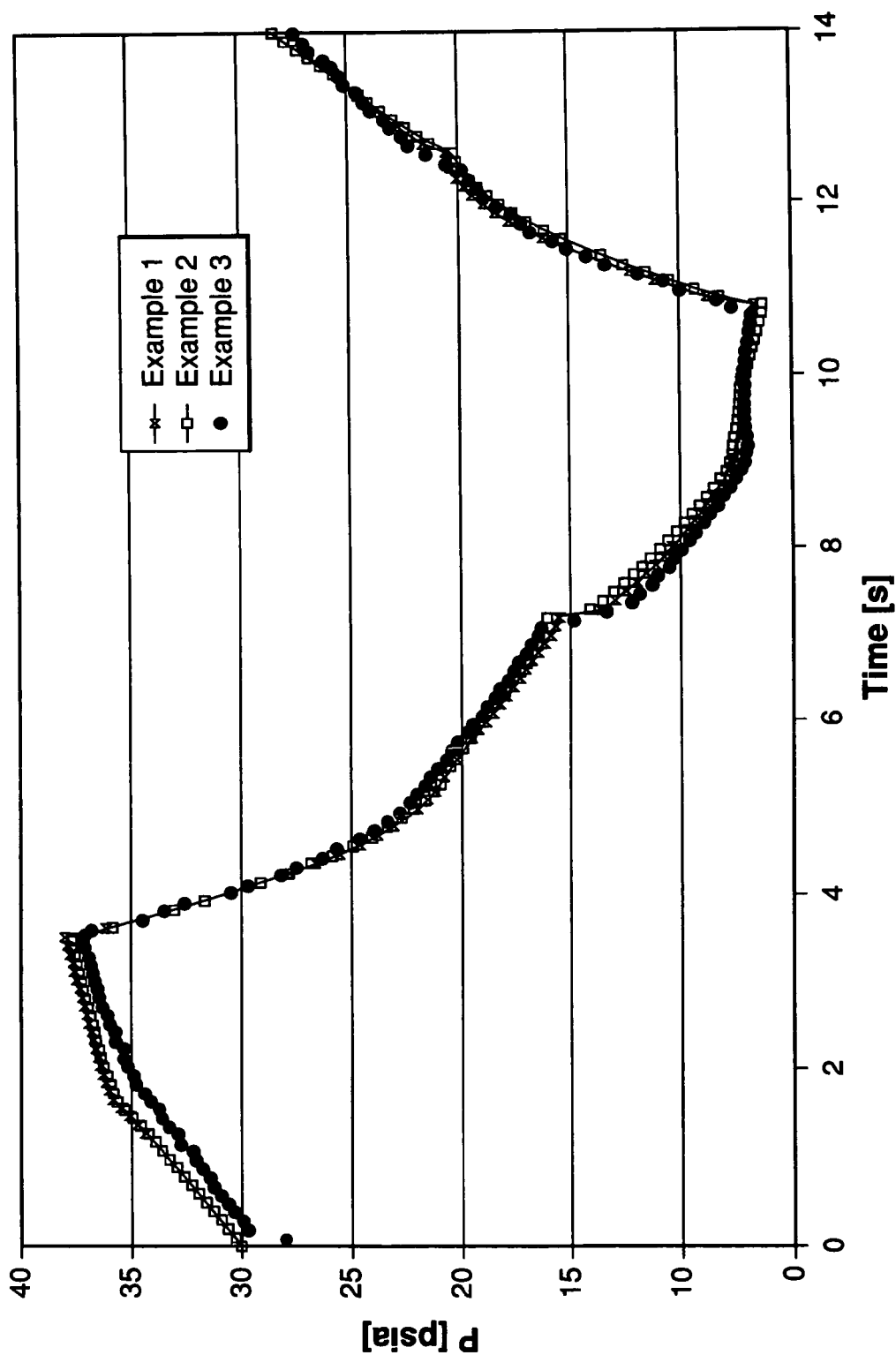
FIG. 3 is a plot of pressure vs. time at the inlet end of any given bed for Examples 1, 2, and 3.

The pressure history at the inlet end of any given bed for Example 1 is given in FIG. 3.

EXAMPLE 2

The simulation of Example 1 was repeated for the cycle described in Tables 1 and 2 including the purge repressurization of step 8 rather than feed repressurization. The purge to feed ratio was similar at 3.30. The oxygen recovery increased to 23.43%.

The pressure profile at the inlet end of any given bed for Example 2 is given in FIG. 3.

EXAMPLE 3

A four-bed pilot PVSA unit was operated according to the cycle described in Tables 1 and 2 to obtain sample performance data for the cycle. Each cycle step had a duration of 1.75 seconds. The pilot unit consisted of 6 columns arranged in a circular pattern with banks of solenoid valves at the feed and product ends of each column. The valves connect to a metal cylinder inside the circle of columns. Channels were cut into the cylinder to insure equal flow paths between all columns. The unit was fully instrumented to confirm mass balance closure and provide temperature, pressure, and flow rate of the various streams. A programmable logic controller operated the cycle and logged the data. Each bed was contained in a column having an inside diameter of 42.7 mm. Four layers of adsorbent were installed in each column including a first layer at the feed end containing 20×28 mesh Alcan Activated alumina having a depth of 26 mm, a second layer containing NaX zeolite with an average particle diameter of 0.6 mm having a depth of 17.0 mm, a third layer containing lithium low silica X zeolite with an average particle diameter of 0.4 mm and a depth of 25 mm, and a fourth layer containing AgLiLSX (40% silver ion-exchanged lithium low silica X zeolite with an average particle diameter of 0.4 mm) having a depth of 145.0 mm.

The pilot unit was operated at approximately 31° C. feed to the beds to produce 0.70 standard liters per minute (Slpm) of oxygen with a purity of 98.9 mole % using a maximum air feed pressure of 37 psia and a feed end pressure ratio (maximum feed pressure to minimum evacuation pressure) of 5.5. The oxygen product recovery was 15.5%.

The pressure profile at the inlet end of any given bed for Example 3 is given in FIG. 3.

The invention claimed is:

1. A process step in a pressure swing adsorption process using multiple parallel adsorbent beds operating in cyclic process steps to recover a less strongly adsorbable component from a feed gas mixture containing at least one less strongly adsorbable component and at least one more strongly adsorbable component, wherein each adsorbent bed has a feed end and a product end, wherein each bed is subjected to at least a feed/product step, one or more depressurization steps, a purge step in which a purge gas enriched in the less strongly adsorbable component is introduced into the product end of the bed and a purge effluent gas is withdrawn from the feed end of the bed, and one or more repressurization steps, wherein the process step comprises introducing at least a portion of the purge effluent gas withdrawn from the feed end of a first adsorbent bed into the feed end of a second adsorbent bed to repressurize the second adsorbent bed.

2. The process of claim 1 wherein the purge gas is provided by a depressurization gas withdrawn from the product end of a third adsorbent bed.

3. The process step of claim 1 wherein the purge effluent gas is withdrawn from the feed end of the first adsorbent bed by a pump and at least a portion of the discharge of the pump is introduced into the feed end of the second adsorbent bed.

4. The process step of claim 3 wherein the pressure in the second adsorbent bed is greater than the pressure in the first adsorbent bed during at least a portion of the process step.

5. The process of claim 4 wherein the pressure in the first adsorbent bed is below atmospheric pressure during at least a portion of the process step.

6. The process of claim 1 wherein each adsorbent bed contains an adsorbent having a Henry's Law selectivity for the more strongly adsorbable component over the less strongly adsorbable component of less than about 2.0.

7. The process of claim 6 wherein the Henry's Law selectivity for the more strongly adsorbable component over the less strongly adsorbable component of less than about 1.5.

8. A pressure swing adsorption process for recovering a less strongly adsorbable component from a feed gas mixture containing at least one less strongly adsorbable component and at least one more strongly adsorbable component, wherein the process comprises performing cyclic process steps in a plurality of adsorbent beds, each bed having a feed end, a product end, and adsorbent material which selectively adsorbs the more strongly adsorbable component, each bed proceeding in turn through cyclic process steps which include a feed/product step, one or more depressurization steps in which gas is withdrawn from the bed at decreasing pressure, a purge step in which a purge gas enriched in the less strongly adsorbable component is introduced into the product end of the bed and a purge effluent gas is withdrawn from the feed end of the bed, and one or more repressurization steps in which gas is introduced into the bed at increasing pressure, wherein one of the repressurization steps comprises introducing at least a portion of the purge effluent gas withdrawn from the feed end of a first adsorbent bed into the feed end of a second adsorbent bed to repressurize the second adsorbent bed.

9. The process of claim 8 wherein purge gas is provided to the product end of the first bed by a depressurization gas withdrawn from the product end of a third adsorbent bed.

10. The process step of claim 8 wherein the purge effluent gas is withdrawn from the feed end of the first adsorbent bed by a pump and at least a portion of the discharge of the pump is introduced into the feed end of the second adsorbent bed.

11. The process step of claim 10 wherein the pressure in the second adsorbent bed is greater than the pressure in the first adsorbent bed during at least a portion of the process step.

12. The process of claim 11 wherein the pressure in the first adsorbent bed is below atmospheric pressure during at least a portion of the process step.

13. The process of claim 8 wherein the adsorbent material contains an adsorbent having a Henry's Law selectivity for the more strongly adsorbable component over the less strongly adsorbable component of less than about 2.0.

14. The process of claim 13 wherein the Henry's Law selectivity for the more strongly adsorbable component over the less strongly adsorbable component of less than about 1.5.

15. A pressure swing adsorption process for the separation of a feed gas containing at least one more strongly adsorbable component and at least one less strongly adsorbable component, which process comprises the steps of:
    (1) introducing the feed gas into a feed end of a first adsorbent bed containing adsorbent material which preferentially adsorbs the more strongly adsorbable component and withdrawing from a product end of the first adsorbent bed a product gas enriched in the less strongly adsorbable component;
    (2) continuing to introduce the feed gas into the first adsorbent bed and to withdraw the product gas from the first adsorbent bed, and introducing a portion of the product gas into the product end of a second bed undergoing a repressurization step;
    (3) terminating the introduction of the feed gas into the first adsorbent bed and the withdrawal of the product gas from the first adsorbent bed, withdrawing depressurization gas from the product end thereof, and introducing the depressurization gas withdrawn from the product end thereof into the product end of a third adsorbent bed undergoing a repressurization step;
    (4) withdrawing additional depressurization gas from the product end of the first adsorbent bed and introducing the depressurization gas withdrawn therefrom into the product end of a fourth adsorbent bed undergoing a purge step;
    (5) evacuating gas from the feed end of the first adsorbent bed;
    (6) introducing a purge gas into the product end of the first adsorbent bed while continuing to evacuate gas from the feed end thereof, and introducing at least a portion of the gas evacuated from the feed end thereof into the feed end of the fourth adsorbent bed undergoing a repressurization step;
    (7) introducing a repressurization gas into the product end of the first adsorbent bed, wherein the repressurization gas is provided by depressurization gas withdrawn from the third adsorbent bed undergoing a depressurization step;
    (8) introducing additional repressurization gas into the product end of the first adsorbent bed, wherein the additional repressurization gas is provided by a portion of the product gas withdrawn from the fourth adsorbent bed undergoing a feed/product step, and introducing a purge effluent gas into the feed end of the first adsorbent bed, wherein the purge effluent gas is provided by at least a portion of the gas evacuated from the feed end of the second adsorbent bed undergoing a purge step; and
    (9) repeating steps (1) through (8) in a cyclic manner.

16. The process of claim 15 wherein the feed gas comprises oxygen, nitrogen, and argon.

17. The process of claim 16 wherein the feed gas is air and the product gas contains at least 97 vol % oxygen.

18. The process of claim 16 wherein the feed gas is air and the product gas contains at least 99 vol % oxygen.

19. The process of claim 16 wherein at least 10% of the oxygen in the feed gas is recovered in the product gas.

20. The process of claim 16 wherein the adsorbent material comprises one or more adsorbents selected from the group consisting of silver exchanged mordenite, silver exchanged X zeolite, silver exchanged low silica X zeolite, and partially silver exchanged lithium low silica X zeolite.

21. The process of claim 16 wherein the adsorbent material contains an adsorbent having a Henry's Law selectivity for argon over oxygen of less than about 2.0.

22. The process of claim 16 wherein the Henry's Law selectivity for argon over oxygen of less than about 1.5.

23. A pressure swing adsorption system for the separation of a feed gas containing at least one more strongly adsorbable component and at least one less strongly adsorbable component comprising
(a) a plurality of adsorber vessels, each adsorber vessel having a feed end, a product end, and a bed of adsorbent material containing at least one adsorbent adapted to selectively adsorb the more strongly adsorbable component;
(b) piping and valves adapted to introduce a feed gas into the feed end of each adsorber vessel and to withdraw a product gas enriched in the less strongly adsorbable component from the product end of each adsorber vessel; and
(c) piping and valves adapted to transfer a depressurization gas enriched in the less strongly adsorbable component from the product end of a first adsorber vessel to the product end of a second adsorber vessel and to transfer a purge effluent gas from the feed end of the second adsorber vessel into the feed end of a third adsorber vessel to repressurize the third adsorber vessel.

24. The pressure swing adsorption system of claim 23 comprising piping and valves adapted to transfer a portion of the product gas enriched in the less strongly adsorbable component into the product end of the third adsorber vessel.

25. The pressure swing adsorption system of claim 23 comprising a pump adapted to transfer the purge effluent gas from the feed end of the second adsorber vessel into the feed end of the third adsorber vessel.

26. A pressure swing adsorption system for the separation of a feed gas containing at least one more strongly adsorbable component and at least one less strongly adsorbable component comprising
(a) four adsorber vessels, each adsorber vessel having a feed end, a product end, and a bed of adsorbent material containing at least one adsorbent adapted to selectively adsorb the more strongly adsorbable component; and
(b) piping and valves adapted to
(1) introduce a feed gas into the feed end of a first adsorber vessel and to withdraw a product gas enriched in the less strongly adsorbable component from the product end of the first adsorber vessel;
(2) transfer a portion of the product gas enriched in the less strongly adsorbable component into the product end of a second adsorber vessel;
(3) withdraw depressurization gas from the product end of the first adsorber vessel and introduce the withdrawn depressurization gas into the product end of a third adsorber vessel;
(4) withdraw depressurization gas from the product end of the first adsorber vessel and introduce the withdrawn gas into the product end of a fourth adsorber vessel;
(5) withdraw gas from the feed end of the first adsorber vessel by use of a vacuum pump or blower and discharge the withdrawn gas as waste gas;
(6) introduce purge gas into the product end of the first adsorber vessel wherein the purge gas is provided from the second adsorber vessel while evacuating the first adsorber vessel from the feed end and introducing at least a portion of the evacuated purge effluent gas into the feed end of the fourth adsorber vessel
(7) pressurize the first adsorber vessel adsorber vessel by introducing repressurization gas into the product end of the first adsorber vessel wherein the repressurization gas is provided by the third adsorber vessel; and
(8) pressurize the first adsorber vessel by introducing product gas obtained from the fourth adsorber vessel into the product end of the first adsorber vessel and introducing purge effluent gas into the feed end of the first adsorber vessel wherein the purge effluent gas is obtained from the second adsorber vessel.

27. The pressure swing adsorption system of claim 26 comprising a pump adapted to transfer the purge effluent gas from the feed end of the first adsorber vessel into the feed end of the fourth adsorber vessel.

28. The pressure swing adsorption system of claim 27 wherein the adsorbent is adapted to selectively adsorb nitrogen and argon from air and has a Henry's Law selectivity for argon over oxygen of less than about 2.0.

29. The pressure swing adsorption system of claim 27 wherein the adsorbent material comprises one or more adsorbents selected from the group consisting of silver exchanged mordenite, silver exchanged X zeolite, silver exchanged low silica X zeolite, and partially silver exchanged lithium low silica X zeolite.

* * * * *